Jan. 5, 1954  A. C. PERBAL  2,665,102
ADJUSTABLE BRACKET STRUCTURE
Filed June 26, 1950  2 Sheets-Sheet 1
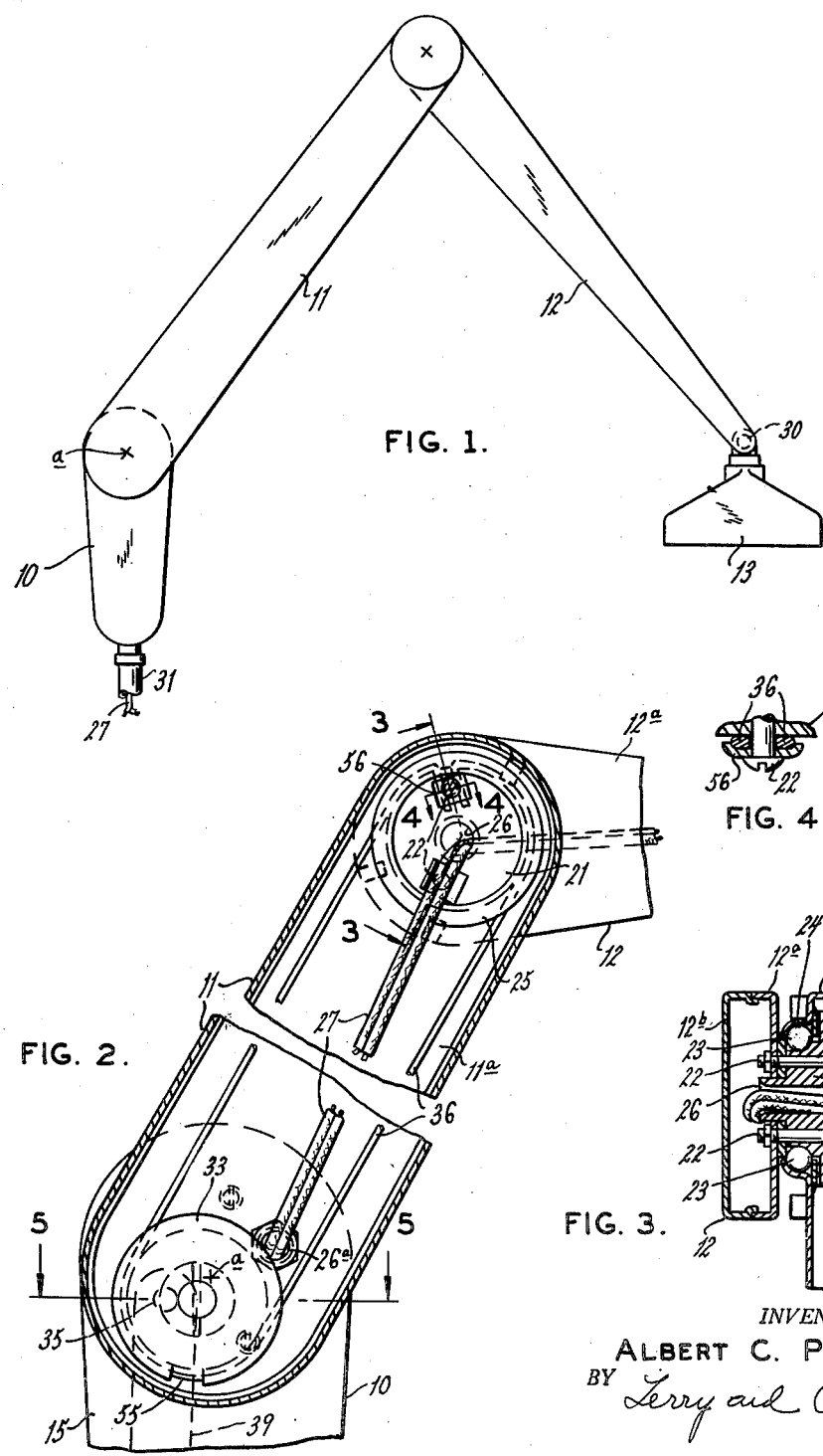
INVENTOR.
ALBERT C. PERBAL
BY Terry and Cohn
ATTORNEYS Jan. 5, 1954        A. C. PERBAL        2,665,102

ADJUSTABLE BRACKET STRUCTURE

Filed June 26, 1950        2 Sheets-Sheet 2

INVENTOR

ALBERT C. PERBAL

BY Terry and Cohn

ATTORNEYS

Patented Jan. 5, 1954

2,665,102

UNITED STATES PATENT OFFICE 2,665,102

ADJUSTABLE BRACKET STRUCTURE

Albert C. Perbal, Lake Arrowhead, Calif.

Application June 26, 1950, Serial No. 170,389

7 Claims. (Cl. 248—280)

This invention relates to improvements in adjustable, freely movable supporting structures of the kind described in my United States Letters Patent Nos. 2,200,518 and 2,299,251. Such has a jointed arm extending from a base part, pivoted thereto so that its sections are movable in vertical planes. The weight of the arms and the supported object on the outer end thereof is counterbalanced by the force produced by a spring located in or on the base part. The spring force is transmitted to the several arm sections in such manner that the entire bracket is in static equilibrium in all positions thereof.

In the device of the present invention the gravitational forces acting on the outer arm section, and those acting on the bracket as a whole are transmitted to a rotatable shaft carried by the inner arm section. These forces tend, respectively, to turn said shaft about its own axis and to displace it bodily. They are opposed by a force produced by a single spring, connected to the shaft in a manner to impart rotational and translational forces which are substantially equal and opposite to those produced by the said gravitational forces, whereby to effect an equilibration of the entire system.

An object of the present invention resides in the provision of an improved spring counterbalancing mechanism for a bracket structure of the character described. Since the bracket arm is adjustable and permits the supported object to be located at various distances away from the base, or primary point of support, the moment of the load force acting on the bracket will vary in direct proportion to the horizontal distance intervening the object and the point of support. The present invention affords an improved spring created counterbalancing force of substantially constant value, and improved means for applying said force to the several portions of the bracket arm, whereby to equilibrate them in all of many positions in which they may be arranged.

Another object is to provide an improved mechanism of this character which lends itself advantageously to being wholly enclosed within the base and arm members of the device.

Other objects are directed to constructional provisions that effect economies in manufacture.

Other objects and advantages will appear from the following description and accompanying drawing wherein:

Fig. 1 is a side elevational view of an adjustable lamp support constructed in accordance with the teachings of the present invention;

Fig. 2 is a fragmentary view of the inner bracket arm assembly, shown partly in section;

Fig. 3 is a sectional view through the hinge joint connecting the inner and outer arms, as taken at line 3—3 of Fig. 2;

Figure 5:
Figure 9:
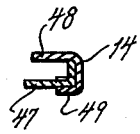
Figure 6:
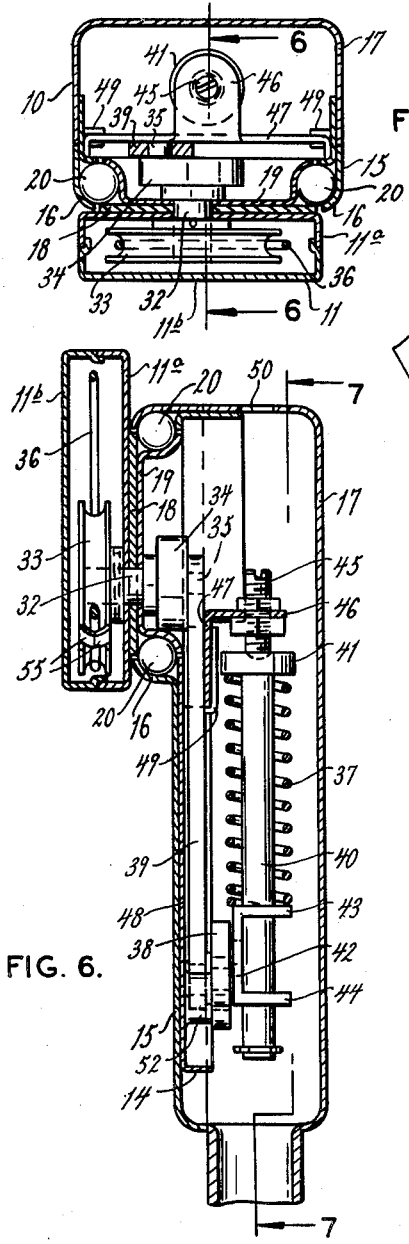
Figure 7:
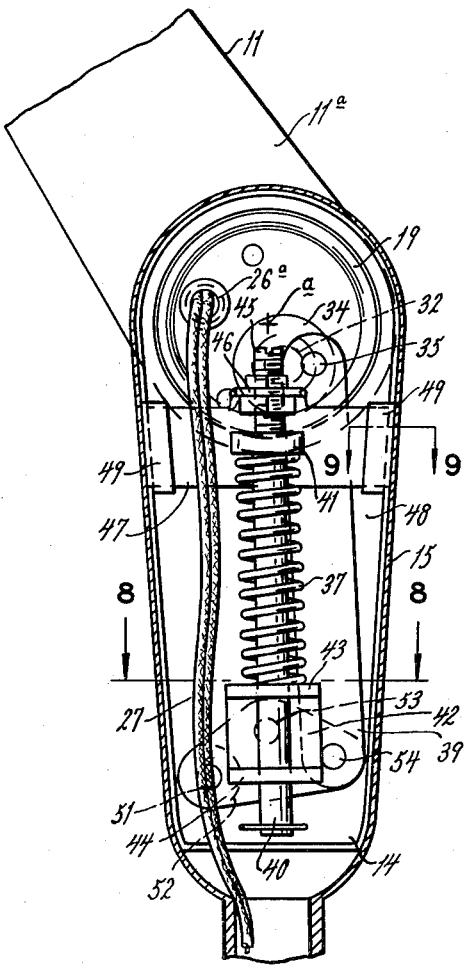
Figure 8:
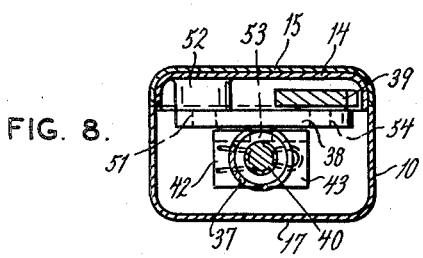

Fig. 4, a sectional view, illustrates clamping means for anchoring the belt cord to the outer arm pulley, the section being taken at line 4—4 of Fig. 2;

Fig. 5 is a transverse sectional view taken at line 5—5 of Fig. 2;

Fig. 6 is a vertical sectional view through the base assembly taken at line 6—6 of Fig. 5;

Fig. 7 is a vertical sectional view taken through the base assembly at line 7—7 of Fig. 6;

Fig. 8 is a transverse sectional view through the base assembly taken at 8—8 of Fig. 7, and Fig. 9 is a detail section taken at line 9—9 of Fig. 7.

Referring now by numerals of reference to the drawings, in Fig. 1 there is illustrated a bracket structure which is generally representative of the present invention, shown therein to consist of a base 10, an innerbracket arm section 11, an outer arm section 12, and the load object 13 in the form of a lamp head, pivotally mounted at the extremity of the outer arm.

The base 10 comprises a vertically elongated housing having an internal frame 14 that provides a support for a spring mechanism, to be subsequently described. An enclosure shell section 15 is rigidly and permanently secured to the frame 14 and combines therewith in the formation of an annular bearing race 16 that surrounds an opening in an upper side wall portion of the base. A detachable shell section or cover 17 completes the base housing structure.

The inner and outer arm members 11 and 12 are hollow. Each preferably consists of a pair of complementary sheet metal stampings which are joined together along their longitudinal edges. The inner arm stamping 11a has a laterally projecting hub at its inner end, said hub consisting of a flat disc 18 welded or otherwise fastened to the outer face of stamping 11a, and a cupped disc 19 similarly secured to the outer face of disc 18. The discs 18 and 19 coact to provide an annular bearing race at the periphery of the hub. As best appears in Fig. 6 this hub assembly extends laterally into, and is journalled in the base 10 by ball bearings 20 which are confined within and between the said annular race portions of the base and hub.

The outer arm 12 is made up of paired stampings 12a and 12b, joined together along their longitudinal edges. This arm is provided at its inner end with a laterally projecting hub 21 (Fig. 3) fixed to the said arm by bolts 22 and formed to provide a peripheral groove to receive and hold antifriction bearings 23. Such bearings are disposed in a bearing race in a lateral boss 24 formed on the outer end portion of the inner arm, and specifically on the arm stamping 11a. This arm hub 21 has a pulley 25 fixed thereto, which pulley is disposed within the inner arm 11. An axial opening 26 that extends through the said hub and pulley provides a passageway for a flexible electric conductor 27, leading from the interior of inner arm 11 to the interior of outer arm 12. A passageway for the said conductor, from the base housing to the inner arm is indicated at 26a.

The lamp head 13 is shown to have a suitable pivot means 30 by which it is mounted on the outer end of arm 12 and is supplied with electrical current by conductors 27.

From the description thus far it will be understood that the outer arm section 12 is mounted on the inner arm 11 so as to pivot thereon in a vertical plane, and the inner arm is similarly mounted on the base structure 10. The said base structure is preferably rotatively supported at its lower end by a standard or other type of mount, indicated generally by the numeral 31, to permit the entire bracket to be turned about a vertical axis on the said mount.

The counterbalancing means for the several arm sections of the bracket include a shaft 32 rotatably mounted on the inner arm 11 and extending eccentrically through the hub portion 18—19 thereof. The axis of the shaft 32 is parallel to and spaced a short distance from the pivotal axis of the inner arm (indicated by the letter a) in the direction directly opposite that in which the arm extends. Accordingly, the inner arm 11 is a lever fulcrumed at the axis a, and having a relatively long lever arm portion extending in one direction and a relatively short lever arm portion terminating at the axis of shaft 32, extending in the opposite direction from the fulcrum.

One end of shaft 32 projects into the interior of the arm 11 and such end has fixed thereon a pulley 33 of the same diameter as pulley 25 previously referred to. The other end of shaft 32 extends into the interior of the base housing and has fixed thereon a crank member, consisting of a disc 34 having a crank pin 35 projecting eccentrically from its outer face. Shaft 32 and the outer arm 12 are operatively connected together for conjoint angular movement about their respective pivotal axes by means of a belt cord 36 that extends longitudinally through the interior of arm 11 and interconnects the pulleys 25 and 33. Accordingly, pivotal movement of the outer arm with respect to the inner arm is accompanied by a turning movement of shaft 32 about its own axis, of equal angular extent. When the inner arm 11 is pivoted about its axis a the shaft 32 is bodily displaced, or translated about that axis.

Gravitational forces acting on the inner and outer arms of the bracket are transmitted to the shaft 32, tending to rotate and translate the same as aforesaid. Such forces are opposed by a force from a spring 37, applied to the crank pin 35 through a transmission linkage consisting of a lever rocker element 38 and a link bar 39. Spring 37 is preferably of the helical, compression variety. It is mounted on a guide rod 40 that extends axially therethrough. The spring bears upwardly against an annular shoulder formed by an enlarged integral head portion 41 on the said guide rod, and bears downwardly upon a seat element 42 through which the rod slidably extends. Spring seat 42 is a C-shaped element having aligned apertures in its upper and lower arms 43 and 44 that provide a passage for the lower end portion of guide rod 40.

The upper end of the spring guide rod 40 is positioned by a vertically adjustable abutment, consisting of a screw 45 threaded in a tab 46 that projects horizontally from the upper margin of a cross plate 47 on the base frame 14. Cross plate 47 is spaced forwardly from the vertical back wall portion 48 of the base frame 14, and is anchored at its ends to the frame by angulate lugs 49 thereon, as best appears from Fig. 9. The spring adjustment screw has a rounded lower extremity which seats in a spherical socket formed in the guide rod head 41, the upwardly directed thrust of the spring on the rod head causing that part to be retained against the adjustment screw. The ball and socket type of engagement between the rod head 41 and the adjustment screw 45 permits the rod to pivot about the lower end of the screw. The adjustment screw is rendered accessible without removing the cover plate 17 by an aligned opening 50 in the upper end wall of the base housing. Thus, a screw driver inserted through the opening 50 may be used to turn the adjustment screw and thereby raise or lower the upper spring seat constituted by the rod head 41, to effect a reduction or increase in spring compression. The described spring adjustment means are desirable in order to adjust for variations in different springs, and to obtain an initial balancing of the system. Further spring adjustment thereafter will seldom be required, unless the weight load on the bracket arms is changed.

Downwardly directed spring force on the spring seat 42 is transmitted to the rocker element 38 which is pivoted at one end by a pivot pin 51 to a boss 52 on the base frame. The rocker element is provided with a forwardly projecting bearing pin 53 located approximately midway between its opposite ends. This pin extends into a bearing aperture in the back portion of spring seat 42, providing a pivotal mounting support for the said seat and serving to transmit the spring force therefrom to rocker 38. From rocker 38 the spring force is transmitted to shaft 32 by the link bar 39. This member extends vertically behind the cross plate 47 and is pivotally connected at its lower end by a pin 54 to the free end of rocker 38, and at its upper end to the shaft crank pin 35.

The crank shaft 32 is intended to remain at all times in definite, predetermined angular relationship with respect to the hub 21 of the outer bracket arm 12. That relationship is such that a radius line from the shaft axis through the crank pin 35 always extends at an angle of 180 degrees to the outer bracket arm 12. This is shown in Fig. 2, wherein it will be observed that the arm 12 is represented as extending horizontally to the right of its pivotal axis, and crank pin 35 is located on a horizontal radius to the left of the shaft axis. The 180 degree relationship aforesaid is maintained by means which prevent slippage of the belt cord 36 on either of the pulleys, consisting of cord clamping tabs 55 on pulley 36, and a screw clamp assembly 56 on pulley 25 for anchoring the ends of the belt cord.

It will now appear that the outer arm may be counterbalanced in all positions thereof about its pivotal axis on the inner arm by a force of definite magnitude, acting downwardly on the crank pin 35. Also, the inner arm 11 may be counterbalanced in all angular positions thereof about its pivotal axis $a$ by another force of definite magnitude acting downwardly on the crank pin 35. A single force equal to the sum of those forces, acting on the pin 35 to counterbalance the several bracket arms in their various angular positions, is provided by the spring 37. Because, in the mechanical system herein described, the horizontal distance between the crank pin 35 and the major axis $a$ of the bracket will be a definite and fixed fraction of the horizontal distance between the major axis $a$ and the load object 13, the ratio of the force on the crank pin required to counterbalance the weight of the load object and the arms 11 and 12 will be approximately the reciprocal of that fraction.

In the improved spring mechanism described and illustrated herein the effective counterbalancing force applied to the crank pin 35 is practically constant, being maintained within very close upper and lower limits for various positions of the bracket arms. Such result is in large part obtained by the described means which reduce to a practical minimum the extent of spring deflection, and which compensate for increased spring force due to deflection, by effecting corresponding changes in the angle at which the spring force is applied to the rocker element 38. Thus, it will be observed, with reference to Fig. 7, that as rocker 38 is caused to swing upwardly about its axis pivot 52, causing increased spring pressure to be applied to the spring seat member 42, the direction of the spring force on the rocker 38 changes, to reduce the effective length of the moment arm on which said increased spring force is acting. Accordingly, the increased spring force is compensated for by the reduction in length of moment arm, and the net result is to produce a substantially constant force on the crank pin 35 to counterbalance the constant gravitational force acting on the bracket. The bracket members may accordingly be easily moved to transfer the supported object from one location to another, as desired, and they will remain in the positions to which they are so adjusted by the counterbalancing action of the described means.

It will be understood that certain changes and modifications may be made in the device herein described without departing from the spirit and full intendment of the invention, which is defined by the appended claims.

I claim:

1. In an adjustable bracket of the character described, a support, a hollow inner bracket arm pivoted at its inner end to the support, an outer bracket arm pivoted to said inner bracket arm, a shaft journalled in the inner bracket arm for rotation about an axis parallel to and spaced from the pivotal axis of said arm, said shaft extending into the inner bracket arm, and means extending longitudinally through said inner arm operatively interconnecting said outer arm and one end of said shaft whereby turning movement of one thereof is imparted to the other, an eccentric bearing member on the opposite end of said shaft and spring counterbalancing means connected to said bearing member.

2. An adjustable bracket of the character described including a base housing, an inner bracket arm having a laterally projecting bearing hub rotatably mounted in the side of the base housing, an outer bracket arm pivoted to the outer end of said inner arm, a shaft extending through said hub portion and journalled therein for rotation about an axis parallel to and spaced from the rotational axis of the said hub, means interconnecting said shaft and the outer bracket arm for conjoint movement about their respective axes, a bearing element projecting eccentrically from said shaft, and spring means connected to said bearing element, adapted to apply a force thereto to counterbalance said inner and outer bracket arms.

3. An adjustable bracket of the character described comprising a base, a hollow inner bracket arm extending from the base at one side thereof, bearing means mounting said bracket arm on said base for pivotal movement in a vertical plane, a transverse shaft carried by said bracket arm at its inner end, said shaft extending eccentrically through said bearing means, an outer bracket arm pivoted to said inner arm, motion transmitting means disposed within the inner arm, said means operatively connecting the outer bracket arm to said shaft, and spring means in said housing, connected to the shaft to apply a turning force thereto substantially equal and opposite to the turning force thereon produced by gravitational action on said bracket arms.

4. An adjustable bracket comprising a base, a hollow inner bracket arm having a hub portion journalled in said base, an outer arm having a hub portion journalled in the outer end of said inner arm, a shaft journalled in said inner arm hub portion, in spaced, parallel relation to the axis thereof, linkage means disposed within said inner arm operatively interconnecting said shaft and the hub of said outer arm for conjoint rotation about their respective axes, and spring means in said base, connected to said shaft, and adapted to apply a force of substantially constant value on said shaft to counterbalance said arms.

5. An adjustable bracket comprising a base, an inner bracket arm having a hub portion journalled in said base, an outer arm having a hub portion journalled in the outer end of said inner arm, a pulley fixed to the hub portion of said outer arm, a shaft journalled in said inner arm hub portion in spaced, parallel relation to the axis thereof, a pulley fixed to said hub portion, a belt linking said pulleys for conjoint rotation, an axially offset crank pin on said shaft, and spring means in said base, operatively connected to said crank pin, and adapted to counterbalance said inner and outer arms.

6. An adjustable bracket comprising a base, a jointed bracket arm having pivotally interconnected inner and outer sections, said bracket arm extending forwardly from said base and being pivoted thereto for movement in a vertical plane, a shaft journalled for rotation in the inner end of said inner arm section, said shaft being disposed with its axis parallel to and spaced rearwardly from the pivotal axis of said inner arm section on the base, motion-transmitting means connecting said shaft and said outer arm section for conjoint movement about their respective axes of rotation, and spring means connected to said shaft, said means applying an axially offset force to said shaft tending both to turn and to translate the same downwardly, whereby to effect a counterbalancing of said inner and outer arm sections.

7. An adjustable bracket comprising a base, a hollow inner arm pivoted to said base, an outer arm pivoted to said inner arm, both of said arms being adapted to move in vertical planes about their respective pivots, a shaft carried by and journalled in the inner end portion of the inner arm, said shaft being disposed with its axis in spaced, parallel relation to the pivotal mounting axis of the inner arm, motion transmitting means within said inner arm operatively interconnecting said shaft and said outer arm for conjoint rotation about their respective pivotal axes, and means for equilibrating said bracket arms, including a spring and means transmitting the force of said spring to said shaft and exerting a turning moment of force thereon to oppose movement of said shaft by gravitational forces acting on said bracket arms.

ALBERT C. PERBAL.

References Cited in the file of this patent

UNITED STATES PATENTS

| Number | Name | Date |
|---|---|---|
| 2,200,518 | Perbal | May 14, 1940 |
| 2,287,577 | Stava | June 23, 1942 |
| 2,299,251 | Perbal | Oct. 20, 1942 |
| 2,547,532 | Mendelsohn | Apr. 3, 1951 |

FOREIGN PATENTS

| Number | Country | Date |
|---|---|---|
| 551,290 | Great Britain | Feb. 16, 1943 |